May 12, 1959

L. SZILARD ET AL 2,886,503

JACKETED FUEL ELEMENTS FOR GRAPHITE MODERATED REACTORS

Filed Feb. 20, 1946

Witnesses:

Inventors:
Leo Szilard
Eugene P. Wigner
Edward C. Creutz
By:
Attorney

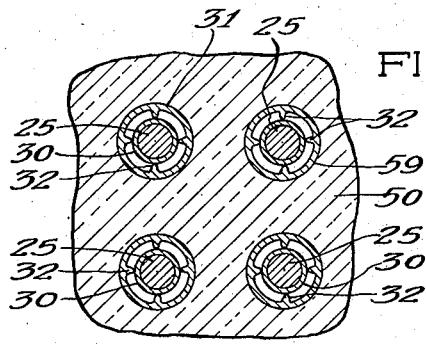
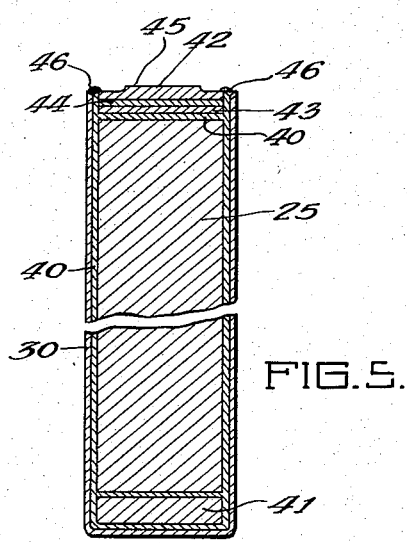
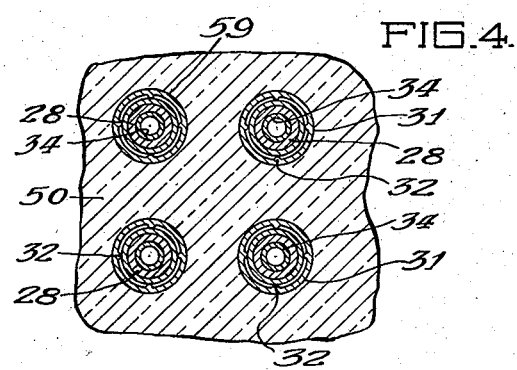
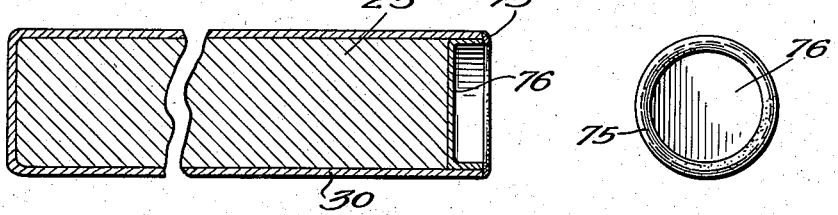
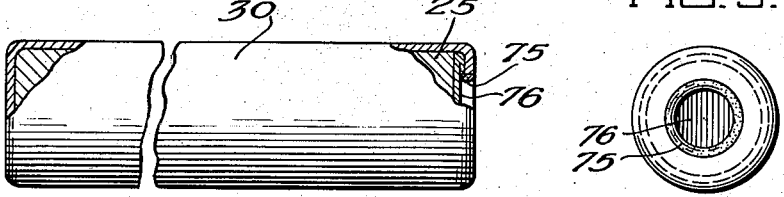

May 12, 1959     L. SZILARD ET AL     2,886,503
JACKETED FUEL ELEMENTS FOR GRAPHITE MODERATED REACTORS
Filed Feb. 20, 1946     4 Sheets-Sheet 4

Witnesses:

Inventors:
Leo Szilard
Eugene P. Wigner
Edward C. Creutz
By:
Attorney

2,886,503

JACKETED FUEL ELEMENTS FOR GRAPHITE MODERATED REACTORS

Leo Szilard, Chicago, Ill., Eugene P. Wigner, Princeton, N.J., and Edward C. Creutz, Santa Fe, N. Mex., assignors to the United States of America as represented by the United States Atomic Energy Commission Application February 20, 1946, Serial No. 649,080

4 Claims. (Cl. 204—193.2)

This invention relates to neutronic reactors and to novel articles of manufacture used in and in combination with such reactors. In neutronic reactors of any type a neutron fissionable isotope such as $U^{233}$, $U^{235}$, or $94^{239}$ or a mixture thereof is subjected to fission by adsorption of neutrons and a self-sustaining chain reaction is established by the neutrons evolved by the fission. Such isotopes are designated thermally fissionable isotopes. The term "thermally fissionable isotope" is used herein, as is common in the art, to refer to an isotope which is fissionable by thermal neutrons. As an example such reactors may comprise bodies or compositions containing such fissionable material, for example, natural uranium, disposed in a neutron slowing material which slow the neutrons to thermal energies. Such a slowing material is termed a neutron moderator. Carbon, beryllium, and $D_2O$ are typical moderators suitable for such use. Heat is evolved during the reaction which is removed by passage of a coolant through the reactor or in heat exchange relationship therewith. Specific details of the theory and essential characteristics of such slow neutron reactors are set forth in copending application of Enrico Fermi and Leo Szilard, Serial No. 568,904, filed December 19, 1944, now Patent No. 2,708,656, granted May 17, 1955. It will be understood that the choice of fissionable and moderator materials, the pattern of distribution of the fissionable material in the moderator, the critical size of the reactive composition comprising fissionable material and moderator required to maintain a self-sustaining reaction, and the means employed to remove the heat generated in the reaction in themselves constitute no part of the present invention, being now known to persons skilled in the art, as exemplified in the above-mentioned co-pending application.

In the operation of neutronic reactors at a substantial power, for example 1000 kilowatts or more, for more than a few minutes difficulty has been encountered due to the fact that the moderator and/or coolant become radioactive during the operation of the reactor. This seriously complicates operation of the reactor since the radioactivity of the coolant may constitute a serious hazard to personnel.

In accordance with the present invention, an improved neutronic reactor has been produced whereby the tendency of the moderator and/or coolant to become radioactive is substantially minimized. It has been found that this result may be secured by interposing a solid nonfissioning barrier between the fissioning isotope and the coolant or moderator or both. Notwithstanding the fact that introduction of nonfissioning isotopes into a neutronic reactor absorbs neutrons and therefore may tend to prevent establishment of a neutron chain reaction, it has been discovered that it is possible to insert nonfissioning barriers into the reactor, and to so proportion the thickness of the barrier to prevent passage of all or a preponderant amount of fission fragments from the fissioning isotope into the moderator and/or coolant while yet avoiding use of such a quantity of barrier that the neutron absorption thereof prevents establishment or maintenance of the neutron chain reaction. The barrier itself should be constructed of a material or materials having a low neutron capture cross section as will be more fully explained hereinafter. Metallic aluminum and beryllium are particularly good materials for this purpose.

While the barrier may be interposed in various ways, a particularly advantageous structure involves the use of a nonfissioning enclosure about the fissioning isotope. An especially effective neutronic reactor may be constructed by providing a neutron moderator with spaced rods, tubes, or other convenient form of solid fissionable material enclosed in a nonfissioning enclosure and extending into or through the moderator.

In order to promote heat transfer from the fissioning isotope through the barrier to the contacting moderator and/or collant, the barrier should be in close intimate contact with the fissioning composition. Generally, special precautions are observed for this purpose. Thus, a shell forming the nonfissioning barrier may be shrunk upon the fissioning component which preferably is in the metallic state. These enclosed fissionable components may be used as the active component of a neutronic reactor, and frequently are located in contact with a coolant such as a gas or liquid coolant for removal of heat from the reactor. Where the coolant has a corrosive effect upon the fissionable metal or other material, the nonfissioning sheath also serves to protect the fissionable material. In such a case, every precaution must be taken to prevent the existence of pores in the sheath through which the coolant may enter. Frequently sheaths are heremetically sealed about the fissionable materal in order to seal the material from the coolant. In a particularly advantageous modification of the invention, the enclosed fissionable bodies are disposed within channels in the moderator through which the coolant is permitted to flow. This coolant may flow externally or internally or externally and internally of the fissionable component.

Not infrequently, difficulty may be encountered in securing a satisfactory transfer of heat through the nonfissioning barrier or sheath. This is particularly true after prolonged operaton of the reactor at various temperatures. In such a case the sheath may tend to shrink from the uranium or other fissioning component making heat transfer difficult. In accordance with a further modification of the invention, this difficulty may be substantially avoided by bonding the aluminum or similar sheath to the uranium by means of a suitable bonding agent. This bonding agent should be sufficiently ductile to withstand a tendency to crack or rupture due to thermal expansion of the uranium or other composition, and also should have a low neutron absorption cross section. Zinc and aluminum-silicon alloys have been found to be suitable where the operating temperature is not unduly high. The bonding layer not only serves to improve transfer of heat but also provides an additional protection against corrosion of the uranium or similar fissioning element by the coolant or moderator.

As previously noted, lengths of the fissionable bodies generally are disposed in channels extending through or at least into the moderator. During the chain reaction the central interior portion of these bodies frequently rises to a temperature much above the temperature of the body exterior which is in close relationship with the coolant. This condition may lead to serious difficulty in a system where a plurality of fissionable bodies are laid end to end through the channels in the moderator and where coolant, particularly a liquid coolant, such as water, is passed in contact with the fissionable bodies or sheathed fissionable bodies. In such a case the ends of each length may be at a temperature substantially higher than the temperature of the sides thereof, and thus the coolant contacting the ends may become seriously overheated and caused to boil. Such boiling would produce an exceedingly hazardous condition in an operating neutronic reactor.

In accordance with a further modification of the invention, this difficulty may be avoided or at least partially eliminated by providing the ends of such lengths of fissionable material with means to prevent the temperature of the ends from reaching an excessive value. This may be done by providing the ends with highly conductive end caps or other means for facilitating heat transfer to the circumference of the elongated bodies. Such intervening segments of heat conductive material improve the heat transfer to the coolant and prevent overheating. In accordance with a further modification, heat insulating means may be provided adjacent the ends of the lengths whereby transfer of heat from the ends of the body segments to the sheath adjacent such ends is substantially reduced. An especially effective modification of the invention comprises a neutron moderator with channels therein, coolant passing through the channels and fissionable bodies in the form of elongated segments laid end to end in the channels and enclosed in a non-fissioning enclosure and heat conducting or heat insulating means between adjoining segments.

Accomplishment of the foregoing constitutes some of the principal objects and advantages of the invention others of which will become apparent from the following description and drawings in which:

Fig. 3 is a fragmentary cross sectional view through the reactor illustrating the relationship of the channels in the reactor of Fig. 1;

Fig. 4 is a fragmentary cross sectional view similar to Fig. 3 and showing a modification thereof;

Fig. 5 is a longitudinal sectional view of a fissionable body enclosed in a modified sheath of non-fissionable material wherein the sheath is bonded to the fissionable body;

Fig. 6 is a longitudinal sectional view of a fissionable body enclosed in a non-fissionable sheath in an early stage of construction of such sheathed body;

Fig. 7 is an end view of the body shown in Fig. 6;

Fig. 8 is a longitudinal view partly in section of the completed body shown as partially complete in Fig. 6;

Fig. 9 is an end view of the completed body shown in Fig. 8;

Figure 1:
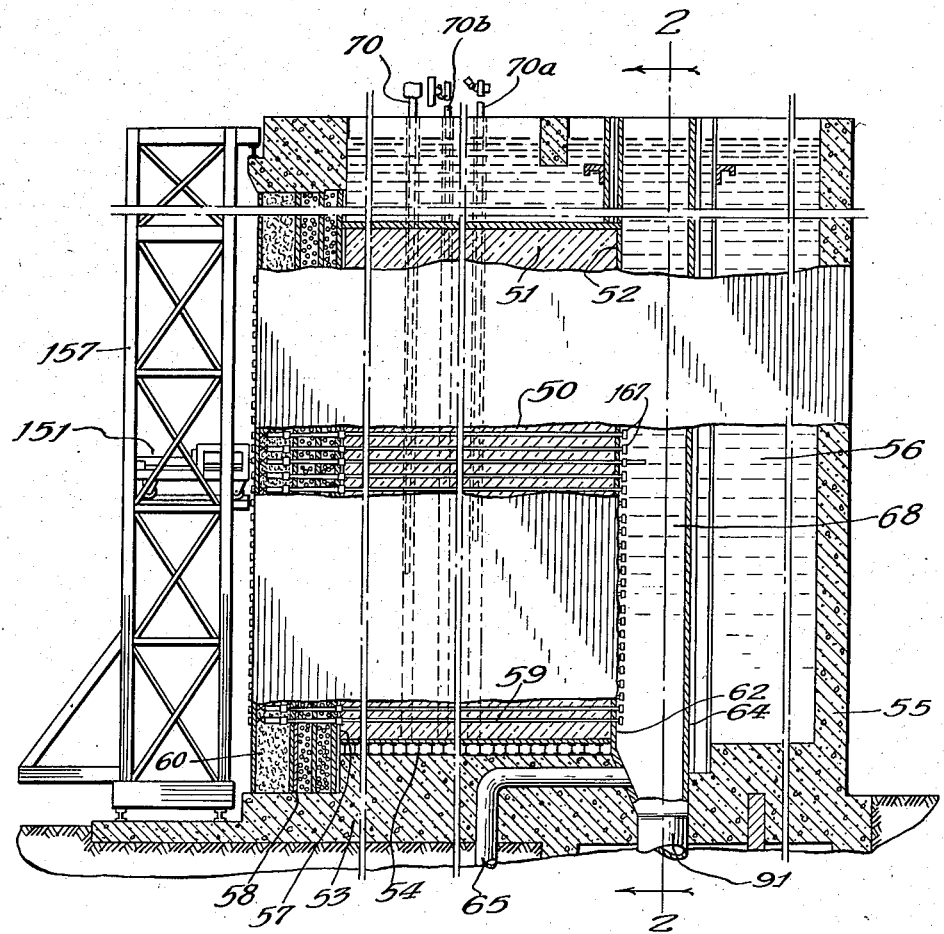
Fig. 1 is a diagrammatic longitudinal sectional view partly in elevation of a liquid cooled neutronic reactor.

In order that a self-sustaining neutronic chain reaction can be established and maintained, the losses of neutrons must be held to a value so low that at least one neutron is available for a new fission, after losses have been deducted, per neutron consumed in production of fission. In fission of $U^{235}$ and similar isotopes, more neutrons are evolved per fission than are required to produce the fission. For example, about 2.3 neutrons are evolved per neutron consumed in fission of $U^{235}$, and about 2.8 neutrons are evolved per neutron consumed in fission of $94^{239}$. These evolved neutrons are used up in fission of further $U^{235}$ or $94^{239}$ atoms or are lost. If losses do not reduce the ratio of neutrons evolved to neutrons consumed or lost below one, the chain reaction will continue.

Losses may be external, as when neutrons escape from the reactor, or internal. Internal losses are caused by absorption of neutrons by atoms which do not fission when the neutron has been absorbed.

$U^{238}$ present in natural uranium absorbs substantial quantities of neutrons to produce $94^{239}$. This loss may be substantially reduced by use of uranium aggregates. Thus, it has been found that $U^{238}$ absorbs neutrons to an appreciable degree at energies (called resonance energies) greater than thermal energies due to its relatively high capture cross section with respect to that of $U^{235}$ at such resonance energies. However, this type of absorption, known as resonance absorption, may be reduced by decreasing the amount of neutrons which pass into a uranium body before these neutrons have been slowed to thermal energy. This may be done by reducing the ratio of surface area per unit weight of uranium, i.e., by using natural uranium in the form of aggregates preferably having a minimum diameter of about 0.5 cm.

Neutron moderators also absorb neutrons. Generally speaking, it is desirable to use as a moderator an element (or compound thereof) of low atomic weight and low neutron capture cross section. The ability to slow down neutrons may be expressed by what is known as the scattering cross section. Whereas the ability to absorb or capture neutrons may be expressed as the capture cross section. The ratio of absorption cross section to scattering cross section of various materials are approximately as follows:

| | |
|---|---|
| Light water ($H_2O$) | 0.00478 |
| Diphenyl | 0.00453 |
| Beryllium | 0.00127 |
| Graphite | 0.000726 |
| Heavy water ($D_2O$) | 0.00017 |

For natural uranium it is preferred to use materials wherein the above ratio is below about 0.004. However, with enriched uranium compositions containing more than natural amounts of $U^{235}$, a greater latitude is permissible. Using carbon or deuterium oxide as moderators and natural uranium as the fissionable composition, only about 1.1 or 1.3 neutrons, respectively, are obtained per neutron consumed due to neutron losses in the $U^{238}$ and the moderator. Since the external neutron losses may be substantial, other internal neutron losses should be held sufficiently low to prevent these losses from rising so high as to prevent the reaction.

Other components of the reactor including the coolant, impurities in the uranium, moderator, control or limiting rods, fission fragments, restraining barrier, etc. absorb neutrons in varying amounts depending upon their neutron capture cross section.

The effect of these impurities or absorbers in a reactor containing natural uranium as the fissionable component has been approximately evaluated for each element as a danger coefficient. This coefficient is computed according to the formula $$\frac{\sigma_i}{\sigma_u} \cdot \frac{A_u}{A_i}$$

where $\sigma_i$ represents the cross section for absorption of thermal neutrons of the impurity; $\sigma_u$ represents the cross section for absorption of thermal neutrons of the uranium; $A_i$ represents the atomic weight of the impurity or neutron absorber; and $A_u$ represents the atomic weight of uranium.

The following table gives presently known values for various elements having their natural isotopic content.

| Element | Danger Coefficient | Element | Danger Coefficient |
|---|---|---|---|
| $H^1$ | 10 | Mo | 1.0 |
| $D^2$ | 0.01 | Ru | ~2 |
| He | 0 | Rh | 50 |
| Li | 310 | Pd | ~2 |
| Be | 0.04 | Ag | 18 |
| B | 2150 | Cd | 870 |
| C | 0.012 | In | 54.2 |
| N | 4.0 | Sn | 0.18 |
| O | 0.002 | Sb | 1.6 |
| F | 0.02 | Te | 1 |
| Ne | <3 | I | 1.6 |
| Na | 0.65 | Xe | <6 |
| Mg | 0.48 | Cs | 8.7 |
| Al | 0.30 | Ba | 0.30 |
| Si | 0.26 | La | <2.4 |
| P | 0.3 | Ce | <2.4 |
| S | 0.46 | Pr | <2.4 |
| Cl | 31 | Nd | ~17 |
| A | ~0.8 | Sm | ~1430 |
| K | 2.1 | Eu | 435 |
| Ca | 0.37 | Gd | ~6320 |
| Sc | <7 | Tb | ~20 |
| Ti | 3.8 | Dy | ~200 |
| V | 4 | Ho | ~10 |
| Cr | 2 | Er | ~40 |
| Mn | 7.5 | Tm | ~20 |
| Fe | 1.5 | Yb | ~10 |
| Co | 17 | Lu | ~30 |
| Ni | 3 | Hf | ~20 |
| Cu | 1.8 | Ta | 4.6 |
| Zn | 0.61 | W | 2.7 |
| Ga | ~1 | Re | ~18 |
| Ge | (<5) | Os | <1.7 |
| As | 2 | Ir | ~70 |
| Se | 6.3 | Pt | ~2.5 |
| Br | 2.5 | Au | 16 |
| Kr | <6 | Hg | 82 |
| Rb | ~0.4 | Tl | 0.5 |
| Sr | 0.57 | Pb | 0.03 |
| Y | 0.4 | Bi | 0.0025 |
| Zr | ~0.13 | Th | 1.1 |
| Cb | <0.4 | | |

From the above it will be apparent that certain elements would not be suitable as barriers in usual neutronic reactors. For example, cadmium, boron and gadolinium absorb neutrons to such an extent that they could not be used with present reactors. On the other hand, aluminum and beryllium are typical of the elements which could be used although the amount thereof must be limited. For example, if a neutronic reactor is capable of supplying 1.06 neutrons per neutron consumed in fission when all losses exclusive of that caused by the sheath have been taken into account, then the amount of aluminum used for a sheath can in no case exceed about $$\frac{0.06}{0.30}$$

part by weight per part of uranium or 20 percent of the weight of the uranium. These principles generally apply as a reasonable approximation to other metals or materials for sheathing. Obviously where the sheath serves as a means for protection of the uranium, the resistance of the metal to corrosion and coolant impermeability must also be considered in selection of the sheath material.

From the above it will be apparent that for a neutron chain reaction to remain self-sustaining the following equation must hold.

$$n-x-y-z-L \geqq 1$$

where $n$ = number of neutrons evolved by a fission of a fissionable isotope per neutron consumed by such isotope.

$x$ = number of neutrons absorbed by a nonfissioning isotope such as $U^{238}$ or $Th^{232}$ in formation of a fissionable isotope per neutron consumed in fission during operation.

$y$ = number of neutrons absorbed by the moderator per neutron consumed in fission.

$z$ = number of neutrons absorbed by other neutron absorbers per neutron consumed in fission during operation.

$L$ = number of neutrons lost by leakage per neutron consumed in fission.

Thus, with $U^{235}$ the sum of $x+y+z+L$ can not exceed about 1.3 and with $94^{239}$ can not exceed about 1.8.

The ratio of the fast neutrons produced in one generation by the fissions to the original number of fast neutrons in a theoretical system of infinite size from which there can be no loss by leakage is called the reproduction factor and is denoted by the symbol $k$. The $k$ constant of a system of finite size is the reproduction factor which the system would have if expanded to infinite size and is therefore a dimensionless constant. Usually this constant is expressed without regard to localized neutron absorbers such as control or limiting rods, which are not uniformly dispersed throughout the entire system. The neutron reproduction ratio ($r$) is an actual value for a finite system, and differs from $k$ by a factor due to loss of neutrons through leakage and through absorption by localized neutron absorbers. To maintain a chain reaction, $r$ must be at least equal to one. As pointed out in the above mentioned Fermi and Szilard application, it is preferably maintained below about 1.01 during operation of the reactor.

Computation of $k$ for any system may be determined experimentally in accordance with methods described in copending application of E. Fermi, Serial No. 534,129, filed May 4, 1944, now Patent No. 2,780,595, granted February 5, 1957, entitled "Neuclear Chain Reacting System."

The reproduction ratio ($r$) may be ascertained by observation of the rate of increase of neutron density. It may also be predicted by computation of losses due to local absorbers or leakage which may be deducted from $k$ to secure this value. In such a case allowance for leakage is made depending upon the size of the reactors. For reactors of practical size, leakage usually amounts to about 0.01 to 0.3 $k$ units depending upon the amount by which the $k$ of the system exceeds one. Loss due to other absorbers may be computed by computation of the danger sum as heretofore described.

Figure 2:
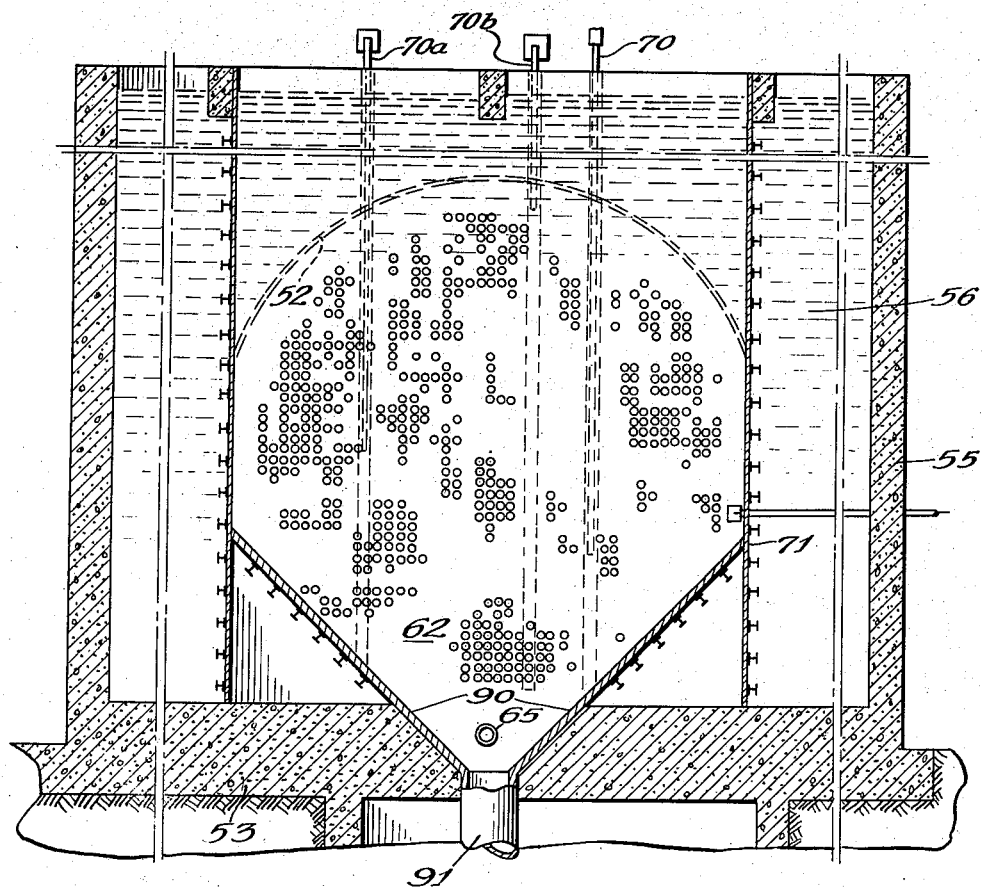
Fig. 2 is a vertical sectional view diagrammatically illustrating the reactor of Fig. 1 taken as indicated by the line 2—2.

The reactor shown in Figs. 1 and 2 comprises a more or less cylindrical structure 50 built of graphite blocks of high purity generally containing less than 0.02 $k$ units in impurities. The reactor is surrounded with a graphite reflector 51 forming an extension of the moderator and is enclosed by a fluid tight steel casing 52, supported on I beams 54 within a concrete tank 55, erected on foundation 53. Tank 55 is preferably filled with water or other neutron absorber 56 to act as a shield for neutrons and gamma radiation.

The encased reactor is surrounded on all sides except one by the water 56, and the side not surrounded, which is to be the charging face 57 of the reactor, is provided with a shield tank 58 filled, for example, with lead shot and water.

A backing wall 64 is placed in tank 55 spaced from outlet face 62 and forming tank 68 which may or may not be filled with water. Aluminum or similar metal coolant tubes 59 extend through the adjacent concrete wall 60, through shield tank 58, through the graphite moderator block 50 to an outlet face 62 of casing 52 to empty into tank 68. Only a few tubes 59 are shown in Fig. 1 for sake of clarity of illustration.

On the outside of tank 55 where the coolant tubes enter the reactor, the ends of coolant tubes 59 are removably capped, and are supplied with coolant under pressure from conveniently positioned manifolds (not shown). Thus water can be passed through tubes 59 to be discharged adjacent to outlet face 62 into tank 68. Water, after having passed through the reactor is removed through outlet pipe 65.

The coolant tubes 59 may be charged with aluminum jacketed uranium bodies, hereinafter described, by uncapping the tube to be loaded and pushing the fissionable bodies into the tubes in end to end relationship. The reactor can then be loaded with sufficient uranium to make the reactor operative to establish high neutron densities, the heat being dissipated by the coolant circulation. This coolant may be water, for example, from a source such as a river, passed once through the reactor, and then discarded, or, the water may be cooled and recirculated in a closed system. Diphenyl and other similar coolants may be used in lieu of water.

The principal dimensions of the reactor are as follows:

| | |
|---|---|
| Axial length of active cylinder of reactor | 7 meters. |
| Radius of active cylinder of reactor | 4.94 meters. |
| Total weight of uranium metal in rods | 200 metric tons. |
| Weight of graphite in reactor | 850 metric tons. |
| Radius of uranium metal rods | 1.7 centimeters. |
| Thickness of aluminum jackets | 0.1 millimeter. |
| Thickness of aluminum pipe | 1.5 millimeters. |
| Thickness of liquid layer | 2.2 millimeters with water or 4 millimeters of diphenyl. |
| Number of rod channels in reactor | 1695. |
| Weight of aluminum in reactor | 8.7 metric tons. |
| Rod spacing in square array | 21.3 centimeters. |

The reactor is loaded from behind the shield from a loading car 151 mounted on traveling elevator 157. The car is aligned with the tube to be loaded and jacketed uranium segments pushed through the tube until the tube has been filled. Details of such loading operations are described in an application of Gale Young, Serial No. 552,730, filed September 5, 1944, now Patent No. 2,774,730, granted December 18, 1956, and form no part of the present invention.

The neutron density in the reactor is controlled by means of cadmium or boron clad aluminum rods or tubes which may be moved into or out of channels in accordance with the desired neutron density, and are diagrammatically illustrated at 70. Limiting or "shim" rods 70a are also provided and generally are locked in place in order to prevent the neutron reproduction ratio from exceeding a safe value above about 1.01. Moreover, removable safety rods 70b are also provided to shut the reactor down by insertion of the rods therein in case of emergency. Both shim and safety rods are constructed similarly to the control rods.

Tank 68 is provided with a bottom 90 which slopes toward the center leading to an outlet 91 for eventual discharge of the enclosed fissionable bodies.

The location of the fissionable bodies in the tubes is diagrammatically illustrated in Figs. 3 and 4. Thus, in Fig. 3 tubes 59 comprise uranium rods, and a protective coating 30 of aluminum completely covering the surface of the uranium rods 25, each rod being surrounded by an aluminum tube 31 of a diameter sufficient to permit passage of coolant over the surface of the rod. The tubes 31 are provided with internally extending longitudinal ribs 32 for centering the rods 25 in the tubes 31.

The structure illustrated in Fig. 4 is similar to that shown in Fig. 3 with the difference that the uranium tube 28 is substituted for the uranium rod 25. By forming the uranium in the form of a tube, a coolant may be circulated internally of the uranium as well as exteriorly thereby providing an additional heat transfer surface. It will be appreciated that the construction could be such that all the coolant passes through the interior of the tube. The tube 28 is lined with a nonfissioning barrier 34.

Inasmuch as the protecting coatings have the property of absorbing neutrons to some extent, it is desirable to maintain the quantity of the aluminum or other sheath within the pile at a minimum in order to make possible a chain reaction therein as previously discussed. Consequently, the thickness of the aluminum tubes and jackets should be maintained at the minimum required from the standpoint of strength, possible corrosion and erosion, and ability to restrain fission products to a substantial degree. Where the jacketed bodies are exposed directly to the attack of a corrosive coolant such as water, the jacket should be hermetically sealed in order to prevent leakage. Hermetic sealing of the uranium rods or tubes in very thin jackets of material having small resistance to neutron passage poses a problem rather difficult of solution, since the thickness of the jackets for the uranium tubes generally is of the order of 0.005 to 0.035 inch. One manner in which the sealing may be accomplished successfully is described below.

For convenience in handling the uranium rods or tubes, they are made in relatively short lengths, for instance, about 8 inches in length. Several methods may be employed for hermetically sealing a uranium body in a thin jacket of aluminum stainless steel or similar material.

A typical jacketed fissionable body which is adapted to resist corrosion of the coolant as well as to restrain fission fragments is shown in Fig. 5. This assemblage comprises a uranium body 25 of circular cross section disposed in a closely fitting aluminum can 30 open at one end and bonded to the uranium by an intermediate interlayer 40. This intermediate layer completely encloses the uranium. A conducting disc of aluminum or similar material 41 is located at the bottom of the uranium body, and is bonded to the bottom of the can and to the uranium by interlayer 40. A similar conducting disc 43 is bonded to the can and to the uranium in a similar manner. A further disc of aluminum or other heat conducting material of low neutron capture cross section 42 serves as a closure tightly welded to the end of the can with a second heat conducting disc of aluminum or the like 44 loosely disposed between the discs 42 and 43. If desired, disc 42 may be provided with a boss or other projection 45 projecting outwardly from the outer surface of the disc. This projection will engage the end of the opposing jacketed body and prevent contact of the two bodies adjacent the welds thereof.

The assemblage may be constructed in the following manner. A uranium rod of proper dimensions is shot blasted and the rod and can are both dipped in molten bronze for 45 seconds at a temperature of 1295–1305° F. The bronzed rod is then dipped in molten tin at 1095–1105° F. and is centrifuged to remove excess coating. Thereafter, the tinned rod is dipped in a molten bath comprising 87 parts by weight of aluminum and 13 parts by weight of silicon at 1095–1105° F. for 6 seconds. The disc 41 coated with aluminum-silicon is inserted in the coated aluminum can, a quantity of the above molten aluminum-silicon composition introduced into the can, and the can is placed in a tightly fitting steel sleeve which has been heated to 1095–1105° F. Thereupon, the tinned uranium rod is forced by hydraulic pressure into the can, excess molten aluminum-silicon forced from the can and disc 43 previously coated with aluminum silicon is set in place and bonded to the end of the uranium rod. The assemblage is then chilled and the edges of the can machined to fit discs 42 and 44 closely. These discs are then inserted and disc 42 is tightly welded to the can as shown at 46. The uranium rod is thus hermetically sealed in the jacket. Similar bodies may be produced using other bonding agents in lieu of aluminum silicon. For example, molten zinc or zinc containing one or more percent of aluminum or zinc-tin, zinc-magnesium, zinc-antimony, or zinc-beryllium alloys may be used to bond the sheath to the uranium or other fissionable body.

Figure 11:
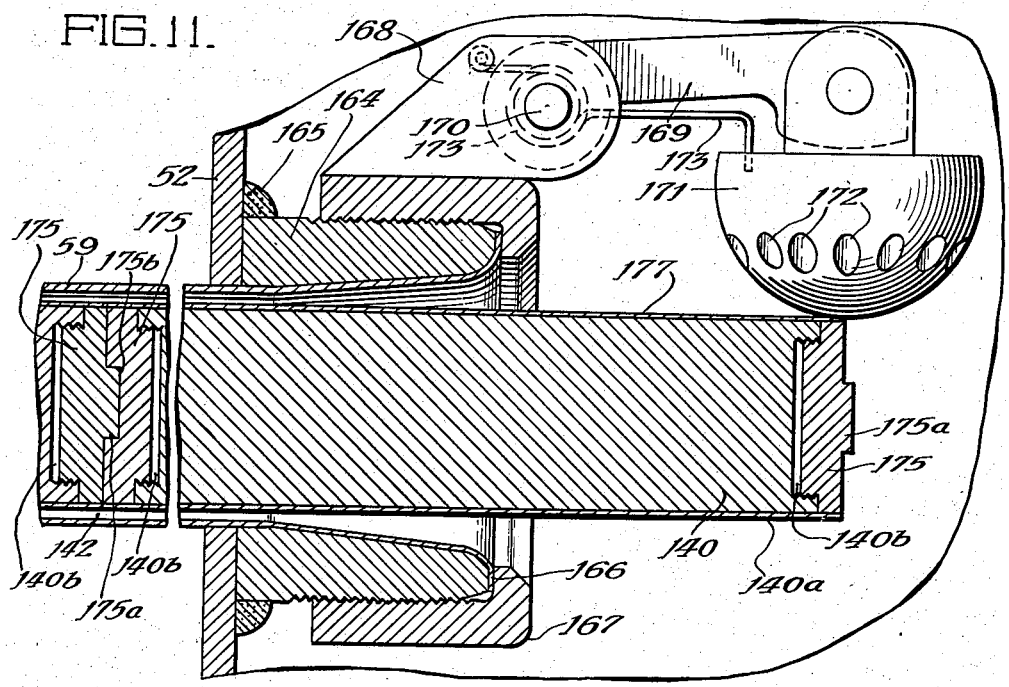
Fig. 11 is a view corresponding to Fig. 10 but showing the fissionable rod projecting from the end of the tube with the rod retainer held in the open position by the rod.
Figure 10:
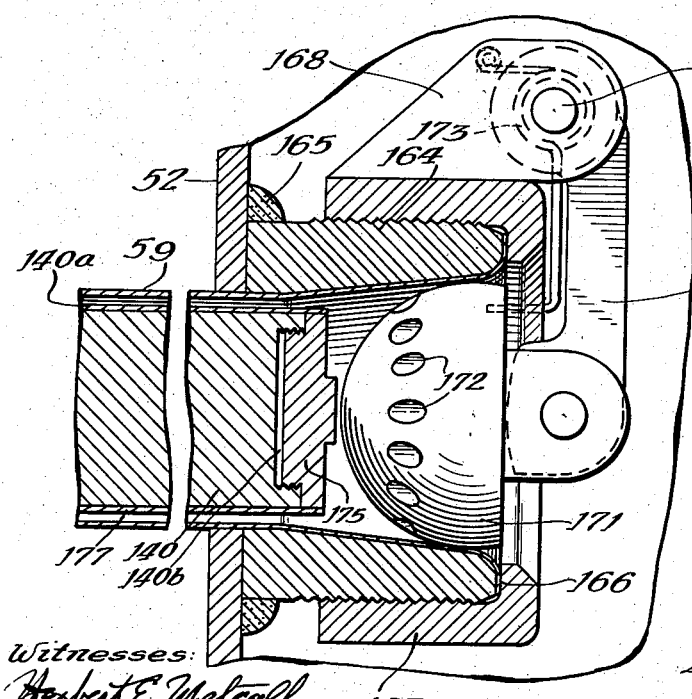
Fig. 10 is an enlarged fragmentary vertical sectional view through the discharge end of one of the tubes of the reactor shown in Fig. 1 and shows in elevation the rod retainer in closed position.

As previously described, jacketed bodies of this type which are slightly smaller than the reactor tubes or channels are disposed in the channels and a coolant such as water or diphenyl is passed through the channels. Because of the rapid flow of coolant through the channels some means is usually provided for restraining movement of the fissionable bodies through the channels. Figs. 10 and 11 diagrammatically illustrate such a means in use with a modified jacketed fissionable body.

As shown therein, the discharge end of each tube 59 passes through sheet 52, and then terminates. Sleeves 164 are welded or otherwise secured as at 165 to the sheet 52. Each tube 59 passes through a sleeve 164. The sleeve 164 is threaded on its peripheral face to receive a cap 167. It is important that water is not permitted to pass between the tube 59 and the sleeve 164 and for this reason each tube 59 is flanged at its end at 166 over the outer edge of the sleeve 164, and cap 167 applies a pressure seal against this flange 166 of tube 59.

The cap 167 is provided with a bifurcated bracket 168 adapted to receive an arm 169 pivotally mounted at 170 on the bifurcated bracket 168. A retainer plug 171 is mounted on the free end of the arm 169 and this plug is substantially hemispherical in shape and adapted to fit into the flared end of the tube 59 as best shown in Fig. 10. The retainer plug 171 is provided with a plurality of perforations 172 to permit the passage of cooling fluid from the tube 59 through plug 171. A torsion spring 173 normally holds retainer plug 171 in its closed position shown in Fig. 10 so that force is required to open the plug to the position shown in Fig. 11 and to retain it in this open position.

In this jacketed embodiment each uranium rod 140 comprises a plurality of rod segments 140a interlocked together to form in effect the continuous rod 140.

On each end of each segment 140a is threaded as at 176 a thick aluminum end cap 175. A space 140b is provided between each end cap 175 and the uranium body to serve as an insulating dead air space. An aluminum sheath 177 closely fits around the sides of each rod segment 140a and is welded to the end cap 175 as at 178, thus completely sealing the uranium rod segment 140a within aluminum. The rod segments 140a are arranged end to end in each tube 59, and the end caps 175 of adjacent ends of adjoining rod segments 140a are provided respectively with male and female portions 175a and 175b cooperating to form an effective interfit between adjacent rod segments. The segments 140a are thereby maintained in proper alinement.

The cooling medium, which for purposes of illustration may be water, enters the tubes 59 at the opposite end thereof, then passes lengthwise through the tubes in the annular space 142 between the walls of tubes 59 and the rods 140. Thus, the water passes over the surface of the aluminum sheath 177 surrounding the uranium in each tube and thereby extracts heat that is conducted to the surface of the aluminum sheath 177 from the uranium rod 140. The water thus passing through each tube 59 flows through the openings 172 in the normally closed rod retainer 171 into the water filled tank 68.

The dead air insulating space 140b tends to prevent transfer of heat from the hot axial portion of the uranium rod to the axial portion of the aluminum cap and thereby avoids corrosion difficulties arising from contact of coolant with an overheated end cap. Other insulating end caps or sections may be used to effect the same result. For example, discs of magnesium oxide, zinc oxide or other insulation may be inserted in the ends in lieu of all or a portion of the aluminum discs 41, 43 and 44 shown in Fig. 5.

While fissionable bodies provided with a sheath which is bonded thereto are especially effective, bonding frequently is found to be unnecessary where no substantial temperature change takes place and/or where the coolant is substantially inert to the fissionable body. Thus a jacketed body may be prepared as illustrated in Figs. 6, 7, 8 and 9. Here a uranium rod 25 is inserted in an aluminum can 30 and the aluminum compressed into intimate contact with the uranium. An aluminum cup 76 is inserted in the open end of the can 30 with the open end portion of the cup parallel and coextensive with the extending portion of the can. The cup 76 and the can 30 are joined by a weld 75. Both the extending ends of the can and cup are then spun down against the flat surface of the cup 76 to make a compact unit. The material forming the can 30 and the cup 76 are extremely thin and unable to withstand physical strain when in the condition shown in Fig. 6, but are sufficiently strong when spun flat. Sheathed bodies of this type are well suited to use in the air cooled neutronic reactor described in the application of Gale Young mentioned herein.

The invention is not confined to use with any specific type of neutronic reactor but may be used generally in all such reactors. For example, a neutronic reactor moderated with deuterium oxide may be constructed using a tank of aluminum 6 feet in diameter and 7 feet 4 inches high. In one such reactor 136 rods of uranium metal 1.1 inches in diameter and having an aluminum jacket 0.035 inch thick were mounted vertically in the tank to extend to within ¼ inch from the bottom of the tank. The reactor was surrounded with a 12 inch reflector of graphite. When 122.4 centimeters of $D_2O$ containing less than 1 percent $H_2O$ was placed in the tank the reactor reached critical size. When 124.7 centimeters of $D_2O$ was introduced the time for doubling of the neutron density therein was about 6.5 seconds.

In such a reactor coolant is not necessary since the liquid moderator ($D_2O$) may be withdrawn, cooled and returned to maintain the temperature of the reaction constant. By using the aluminum jacket on the uranium the tendency for the moderator to become radioactive is substantially reduced and outside circulation becomes feasible.

Numerous fissionable compositions may be used in accordance with the present invention. In addition to natural uranium metal, uranium compounds such as uranium oxide, or uranium carbide may be used. Moreover uranium containing more than natural concentrations of $U^{235}$ are suitable for neutronic reactors. Other suitable compositions include $U^{233}$, $U^{235}$, or $94^{239}$ taken alone or in combination with $U^{238}$ or $Th^{232}$, the isotopes being either in combined or elemental form.

Compounds of fissionable elements such as the oxide, carbide, carbonate, uranyl fluoride or similar compound may be used in lieu of the element in metallic state. In such a case the problem of corrosion of the uranium may be reduced and therefore hermetical sealing or the use of a corrosion resistant or coolant impermeable jacket or barrier may be unnecessary in such a case so long as a barrier which is capable of restraining fission fragments from entry into the moderator and/or coolant is interposed. The same may be true where the fissionable body is located in the moderator and coolant is passed through the reflector or another portion of the moderator out of contact with the uranium.

While the present invention has been described as used in conjunction with reactive compositions using a moderator, with the chain reaction being sustained by slow neutron fission, it is equally applicable to what are known as controllable fast neutron fission reactors where the reactive composition may be a solid block of metal (such as uranium enriched in $U^{235}$). In this case the coolant may be circulated in channels in the blocks, with the non-fissioning barrier described herein positioned between the coolant and the metal of the blocks.

Many other variations of and applications for our invention will be apparent to those skilled in the art and our invention is, therefore, to be limited only by the scope of the appended claims.

What is claimed is:

1. In a neutronic reactor comprising a graphite neutron moderator, bodies of natural uranium sufficient in amount to establish a self-sustaining chain reaction and being disposed in said moderator, and a water coolant in said moderator adjacent to but spaced from said natural uranium bodies, the improvement comprising a jacket hermetically enclosing the uranium bodies so as to provide a barrier between the uranium bodies and the moderator and to protect the uranium bodies from the water coolant, said jacket being of a material and a thickness such that the aggregate of the products of the danger coefficients of said material and any other material present in the reactor and the relative weights thereof with respect to the uranium is not more than 0.1.

2. A neutronic reactor as specified in claim 1, the material of the jacket being aluminum and the thickness of the jacket being such that the weight thereof is not more than one-third the weight of the uranium.

3. An article of manufacture for use in a neutronic reactor employing a graphite moderator, said article comprising a body of natural uranium having thereon a jacket, the product of the danger coefficient of the material of the jacket and the relative weight thereof with respect to the uranium being less than 0.1.

4. An article of manufacture as specified in claim 3, the jacket being of aluminum and having a thickness such that the weight of the jacket is not more than one-thrid the weight of the uranium.

References Cited in the file of this patent
UNITED STATES PATENTS

| | | |
|---|---|---|
| 2,091,554 | Mendenhall | Aug. 31, 1937 |

FOREIGN PATENTS

| | | |
|---|---|---|
| 114,150 | Australia | May 2, 1940 |
| 114,151 | Australia | May 3, 1940 |
| 861,390 | France | Oct. 28, 1940 |
| 233,011 | Switzerland | Oct. 2, 1944 |

OTHER REFERENCES

Fermi et al.: "Artificial Radioactivity Produced by Neutron Bombardment II," Proc. Roy. Soc. (London), Series A, No. 868, vol. 149, pp. 554–7, April 1935.

Smyth: "Atomic Energy for Military Purposes," p. 103, August 1945.

Kelly et al.: "Physical Review," 73 1135–9 (1948).